(12) United States Patent
Lee

(10) Patent No.: US 10,904,957 B2
(45) Date of Patent: Jan. 26, 2021

(54) COIL ASSEMBLY AND INDUCTION HEATING DEVICE INCLUDING A COIL ASSEMBLY

(71) Applicant: LG ELECTRONICS INC., Seoul (KR)

(72) Inventor: Heejun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 16/018,167

(22) Filed: Jun. 26, 2018

(65) Prior Publication Data

US 2018/0376547 A1    Dec. 27, 2018

(30) Foreign Application Priority Data

Jun. 26, 2017  (KR) .................. 10-2017-0080802

(51) Int. Cl.
*H05B 6/12*  (2006.01)
*H05B 6/36*  (2006.01)

(52) U.S. Cl.
CPC ......... *H05B 6/1272* (2013.01); *H05B 6/1245* (2013.01); *H05B 6/1281* (2013.01); *H05B 6/365* (2013.01); *H05B 2206/022* (2013.01); *H05B 2213/03* (2013.01)

(58) Field of Classification Search
CPC .... H05B 6/1245; H05B 6/365; H05B 6/1272; H05B 6/1281; H05B 6/362; H05B 2206/022; H05B 2213/03
USPC ................. 219/626, 665, 662, 668
See application file for complete search history.

(56) References Cited

U.S. PATENT DOCUMENTS

| | | | | |
|---|---|---|---|---|
| 2017/0164777 A1* | 6/2017 | Everett, Jr. | .......... | H05B 6/1272 |
| 2017/0196047 A1* | 7/2017 | Polyak | .................... | H05B 6/105 |
| 2018/0025838 A1* | 1/2018 | Som | ........................ | H02J 50/10 |
| | | | | 361/143 |
| 2018/0229543 A1* | 8/2018 | Banziger | ................. | B44B 5/028 |

FOREIGN PATENT DOCUMENTS

| | | |
|---|---|---|
| CH | 711 441 | 2/2017 |
| EP | 0 277 075 | 8/1988 |
| EP | 0 283 859 | 9/1988 |
| JP | 2006-066258 | 3/2006 |
| JP | 2013-134841 | 7/2013 |
| JP | 2015-225691 | 12/2015 |
| KR | 10-1996-0006697 | 2/1996 |
| KR | 10-1450238 | 10/2014 |
| WO | WO 2011/067708 | 6/2011 |

OTHER PUBLICATIONS

Korean Office Action dated Apr. 3, 2019 issued in Application No. 10-2017-0080802.
European Search Report dated Nov. 6, 2018.

\* cited by examiner

*Primary Examiner* — Dana Ross
*Assistant Examiner* — Joe E Mills, Jr.
(74) *Attorney, Agent, or Firm* — Ked & Associates LLP

(57) ABSTRACT

A coil assembly and an induction heating device including a coil assembly are provided. The coil assembly may include a coil frame having a shape corresponding to a shape of a heating region defined in a plate. A working coil may extend alternately in between opposite first and second directions, rather than being circularly arranged as in related art coil assemblies.

14 Claims, 8 Drawing Sheets

COIL ASSEMBLY AND INDUCTION HEATING DEVICE INCLUDING A COIL ASSEMBLY

CROSS-REFERENCE TO RELATED APPLICATION(S)

This application claims priority to and the benefit of Korean Patent Application No. 10-2017-0080802, filed in Korea on Jun. 26, 2017, the disclosure of which is incorporated herein by reference in its entirety.

BACKGROUND

1. Field

A coil assembly and an induction heating device including a coil assembly are disclosed herein.

2. Background

In homes and restaurants, cooking devices using various heating methods to heat food or other items (hereinafter, "food") are being used. Conventionally, gas ranges using gas as fuel have been widely used. However, in recent years, there has been an increase in devices for heating a cooking vessel containing food, such as a pot or container, using electricity without using gas.

A scheme of heating a cooking vessel containing food using electricity is divided into a resistive heating type and an induction heating type. In the electrical resistive heating method, heat generated when current flows through a metal resistance wire or a non-metallic heating element, such as silicon carbide, is transmitted to the cooking vessel through radiation or conduction, thereby heating the cooking vessel. In the induction heating method, when high-frequency power of a predetermined magnitude is applied to the working coil, an eddy current is generated in the cooking vessel made of a metal using a magnetic field generated around the working coil so that the cooking vessel itself is heated.

The principle of the induction heating scheme is as follows. First, as power is applied to the induction heating device, a high-frequency voltage of a predetermined magnitude is applied to the working coil. Accordingly, an inductive magnetic field is generated around the working coil disposed in the induction heating device. When the magnetic-flux of the inductive magnetic field thus generated passes through a bottom of the cooking vessel containing metal positioned on the induction heating device, an eddy current is generated inside the bottom of the cooking vessel. When the resulting eddy current flows in the bottom of the cooking vessel, the cooking vessel itself is heated.

When the induction heating device is used, a plate of the induction heating device is not heated but only the cooking vessel itself is heated. Thus, when the cooking vessel is lifted up from the plate of the induction heating device, the inductive magnetic field around the coil is extinguished, and thus, the cooking vessel immediately ceases to be heated. Further, as the working coil in the induction heating device is not heated, a temperature of the plate is kept at a relatively low temperature even during cooking, which is advantageous for safety.

Furthermore, as the induction heating device heats only the cooking vessel itself by induction heating, the induction heating device has a more energy-efficient advantage over the gas-range or resistance heating based device. Another advantage of such an induction heating device is that it may heat the cooking vessel faster than other heating scheme based devices. The higher the output of the induction heating device, the faster the cooking vessel may be heated.

FIG. 1 is a perspective view of a related art induction heating device. As shown in FIG. 1, an induction heating device 10 includes a casing 110, and a cover plate 102 that seals the casing 110. In a space formed inside the casing 110, one or more working coils 114a and 114b having a circular shape are disposed.

The cover plate 102 coupled with the casing 110 includes a plate 104 on which a cooking vessel, such as a pot or container to be heated, is placed. When the cover plate 102 is engaged with the casing 110, heating regions 104a and 104b having positions respectively corresponding to positions of the working coils 114a and 114b disposed inside the casing 110 may be defined in the plate 104. The heating regions 104a and 104b may have a circular shape corresponding to shapes of the working coils 114a and 114b.

With power supplied to the induction heating device 10, the user places the cooking vessel on one of the heating regions 104a and 104b. Then, the user performs a manipulation to select the heating region, and a manipulation to select a heating power of the selected heating region via a manipulation interface (not shown) formed on the plate 104.

After the manipulation of the user, it is confirmed via a cooking vessel sensing operation of the induction heating device 10 that the cooking vessel having an induction heating property is placed on the selected one of the heating regions 104a and 104b. Thus, current is applied to the working coil corresponding to the selected heating region by a control unit or controller (not shown) and a power supply (not shown). In this way, an inductive magnetic field between the cooking vessel and the working coil is formed such that the cooking vessel begins to heat up.

However, when using the conventional induction heating device 10 having the configuration shown in FIG. 1, the cooking vessel must be placed on one of the heating regions 104a and 104b so that a top surface of the one of the heating regions 104a and 104b defined in the plate 104 and a bottom surface of the cooking vessel conform or correspond with each other. When the top surface of the one of the heating regions 104a and 104b and the bottom surface of the cooking vessel do not conform or correspond with each other, the inductive magnetic field between the working coils 114a and 114b disposed below the heating regions 104a and 104b and the cooking vessel is weakened. This makes it difficult to reach the user-set heating power and hence a power efficiency of the induction heating device 10 is lowered. Further, when the top surface of the one of the heating regions 104a and 104b and the bottom surface of the cooking vessel do not conform or correspond with each other, the inductive magnetic field may fail to occur between the working coils 114a and 114b disposed below the heating regions 104a and 104b and the cooking vessel. The cooking vessel may not be heated up.

Further, as the heating regions 104a and 104b of the related art induction heating device 10 shown in FIG. 1 generally have a circular shape, the shape of the cooking vessel to be placed on the regions is also limited to a circular shape.

In order to overcome the above-mentioned disadvantages of the related art induction heating device 10, recently, an induction heating device employing a free zone or zone free scheme has been introduced.

FIG. 2 is a perspective view of a related art induction heating device employing a free zone scheme. Referring to FIG. 2, an induction heating device 20 having the free zone scheme includes a casing 210 and a cover plate 202 that seals the casing 210. The cover plate 202 includes a plate 204. A heating region 206 for receiving a cooking vessel, such as a pot or container to be heated, may be defined in the plate 204.

As shown in FIG. 2, the heating region 206 of the induction heating device 20 with the free zone scheme is formed in a square shape, which covers most of an area of the plate 204. Accordingly, even when the user places the cooking vessel on any location in the heating region 206, the heating of the cooking vessel may be realized.

Therefore, when compared with the conventional induction heating device 10 shown in FIG. 1, the user does not need to conform or correspond a bottom surface of the cooking vessel to a top surface of heating regions 104a and 104b, thereby increasing convenience, when using the configuration of FIG. 2. Further, the induction heating device is less likely to be power-inefficient or less likely to fail to heat the cooking vessel, which is otherwise the case when the user places the cooking vessel in the wrong position.

In the casing 210 of the induction heating device 20 employing the free zone scheme shown in FIG. 2, one or more working coils 212a, 212b, and 212c may be disposed to correspond to the heating region 206. As shown in FIG. 2, each of the working coils 212a, 212b, and 212c of the induction heating device 20 employing the free zone scheme has an elliptical shape having a major axis and a minor axis. Generally, each of the working coils 212a, 212b, and 212c may be fabricated by pressing and deforming one side of each of the circular working coils 114a and 114b shown in FIG. 1.

After placing the cooking vessel to be heated on or at any location within the heating region 206 of the induction heating device 20 having such a configuration, the user may select a heating power of the heating region via manipulation of a manipulation interface (not shown) formed in or on the plate 204. When it is confirmed that the cooking vessel having an induction heating property is loaded on the heating region 206 via a cooking vessel sensing operation of the induction heating device 20, current is applied to one of the working coils 212a, 212b and 212c, which is located at a position corresponding to a position of the cooking vessel placed on the heating region 206. This current application is performed by a control unit or controller (not shown) and a power supply (not shown). This results in an inductive magnetic field between the cooking vessel and the working coil, and the cooking vessel begins to heat up. However, as shown in FIG. 2, between the working coils 212a, 212b, and 212c included in the conventional induction heating device 20 employing the free zone scheme, and between the working coifs 212a, 212b, and 212c and walls of the casing 210, non-coil regions 220a to 220h corresponding to the heating region 206 but not corresponding to the working coils are present.

When the cooking vessel to be heated is placed on or at positions corresponding to the non-coil regions 220a to 220h, the inductive magnetic field between the working coils 212a, 212b, and 212c and the cooking vessel is weakened, and thus, the power efficiency is lowered. Further, there is a problem of increased heating time and cooking time of the cooking vessel.

BRIEF DESCRIPTION OF THE DRAWINGS

Embodiments will be described in detail with reference to the following drawings in which like reference numerals refer to like elements, and wherein.

DETAILED DESCRIPTION

Figure 1:
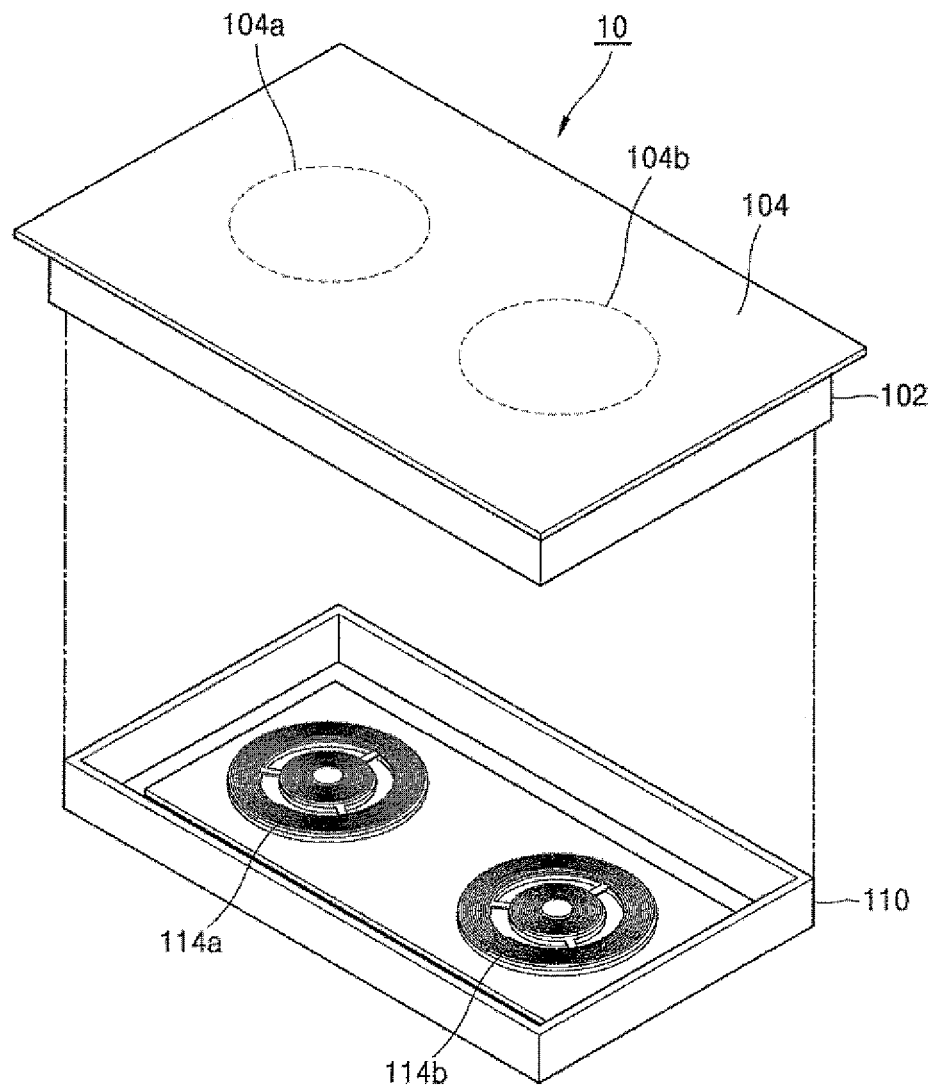
FIG. 1 is a perspective view of a related art induction heating device.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Further, in the following detailed description of embodiments, numerous specific details are set forth in order to provide a thorough understanding. However, it will be understood that embodiments may be practiced without these specific details. In other instances, well-known methods, procedures, components, and circuits have not been described in detail so as not to unnecessarily obscure aspects.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another elements or features as illustrated in the figures. It will be understood that the spatially relative terms are intended to encompass different orientations of the induction heating device in use or in operation, in addition to the orientation depicted in the figures. For example, if the induction heating device in the figures is turned over, elements described as "below" or "beneath" or "under" other elements or features would then be oriented "above" the other elements or features. Thus, the example terms "below" and "under" can encompass both an orientation of above and below. The induction heating device may be otherwise oriented for example, rotated 90 degrees or at other orientations, and the spatially relative descriptors used herein should be interpreted accordingly.

The terminology used herein is for the purpose of describing particular embodiments only and is not intended to be limiting. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding. The embodiments may be practiced without some or all of these specific details. In other instances, well-known process structures and/or processes have not been described in detail in order not to unnecessarily obscure the embodiments.

Figure 3:
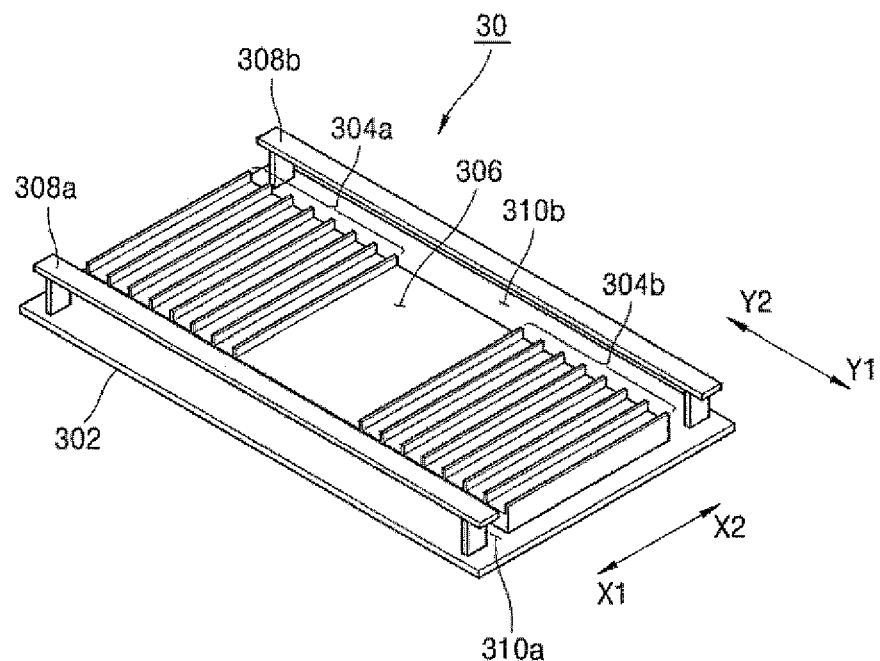
FIG. 3 is a top perspective view of a coil frame included in a coil assembly according to an embodiment.
Figure 4:
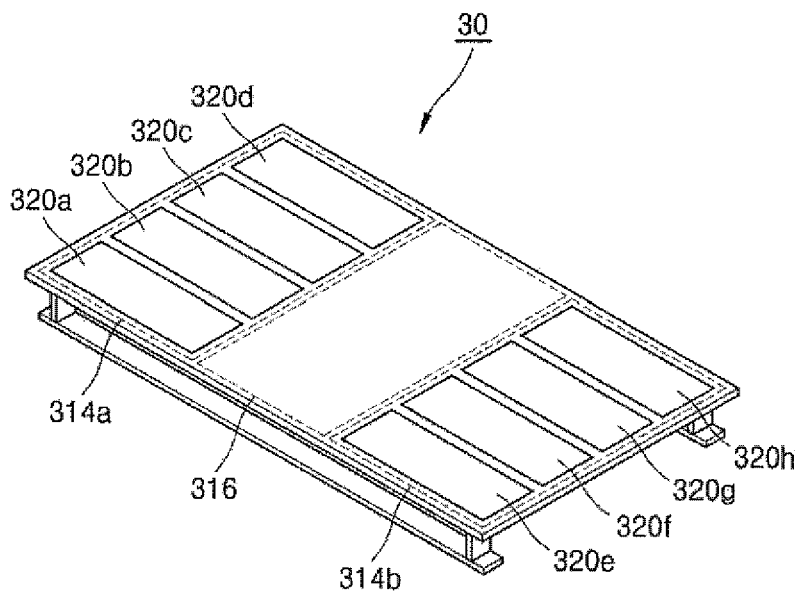
FIG. 4 is a bottom perspective view of the coil frame included in the coil assembly according to an embodiment.

FIG. 3 is a top perspective view of a coil frame included in a coil assembly according to an embodiment. FIG. 4 is a bottom perspective view of the coil frame included in the coil assembly according to an embodiment.

Referring to the drawings, a coil assembly 30 according to an embodiment may include a coil frame 302 that supports a working coil. The coil frame 302 shown in the figure has a rectangular shape. The shape may correspond to a shape of a heating region defined in a plate of an induction heating device as described hereinafter. However, a shape of the coil frame 302 may vary depending on the embodiment.

On the coil frame 302, there are coif accommodation structures constructed for accommodating working coils, that is, a first coil accommodation structure 304a and a second coil accommodation structure 304b. Each of the first coil accommodation structure 304a and the second coil accommodation structure 304b has at least one coil receiving groove defined therein for accommodating a corresponding working coil.

As described below, each of the first and second working coils is alternately turned in a first direction (from X1 to X2) or a second direction (from X2 to X1) and along the coil receiving groove defined within each of the first coil accommodation structure 304a and the second coil accommodation structure 304b. Thus, an arrangement shape of the working coil extending in the first coil accommodation structure 304a is substantially similar to a contour shape of the first coil accommodation structure 304a. Further, an arrangement shape of the working coil extending in the second coil accommodation structure 304b is substantially similar to a contour shape of the second coil accommodation structure 304b. This shape is square in this example. However, embodiments are not limited thereto. The contour shape of each of the first coil accommodation structure 304a and the second coil accommodation structure 304b, and the arrangement shape of the working coils may vary depending on the embodiment. Further, a magnetic flux generation region 306 may be defined between the first coil accommodation structure 304a and the second coil accommodation structure 304b. When a current is applied to the working coils accommodated in the first coil accommodation structure 304a and the second coil accommodation structure 304b, magnetic flux is generated in the magnetic flux generation region 306 and flows therein.

As shown in the figure, the coil receiving groove is not formed in the magnetic flux generation region 306, and thus, the working coil is not disposed therein. An area occupied by the magnetic flux generation region 306 on the coil frame 302 may vary depending on a power requirement based on a specification of the induction heating device, a length of the working coil, and an area of each of the first coil accommodation structure 304a and the second coil accommodation structure 304b.

Along both sides of the first coil accommodation structure 304a, the second coil accommodation structure 304b, and the magnetic flux generation region 306, coil holding structures, that is, a first coil-holding structure 308a and a second coil holding structure 308b extend respectively. As shown in the drawing, the first coil holding structure 308a and the second coil holding structure 308b extend in a direction (Y1↔Y2) that intersects the extending direction of the working coil, that is, the first direction (from X1 to X2) or the second direction (from X2 to X1).

When the working coils extend in and along the first coil accommodation structure 304a and the second coil accommodation structure 304b, the first coil holding structure 308a and the second coil holding structure 308b may change the direction of the working coil from the first direction (X1→X2) to the second direction (X2→X1) or change the second direction (X2→X1) to the first direction (X1→X2). A first intersecting space 310a and a second intersecting space 310b may be defined between the first coil accommodation structure 304a, the second coil accommodation structure 304*b*, the magnetic flux generation region 306, and the first coil holding structure 308*a* and the second coil holding structure 308*b*, respectively. The first intersecting space 310*a* may be defined between the first and second coil accommodation structures 304*a* and 304*b* and the first coil holding structure 308*a*. The working coil extending from the first and second coil accommodation structures 304*a* and 304*b* toward the first coil holding structure 308*a* may pass through the first intersecting space 310*a*. The second intersecting space 310*b* may be defined between the first and second coil accommodation structures 304*a* and 304*b* and the second coil holding structure 308*b*. The working coil extending from the first and second coil accommodation structures 304*a* and 304*b* toward the second coil holding structure 308*b* may pass through the second intersecting space 310*b*.

Figure 5:
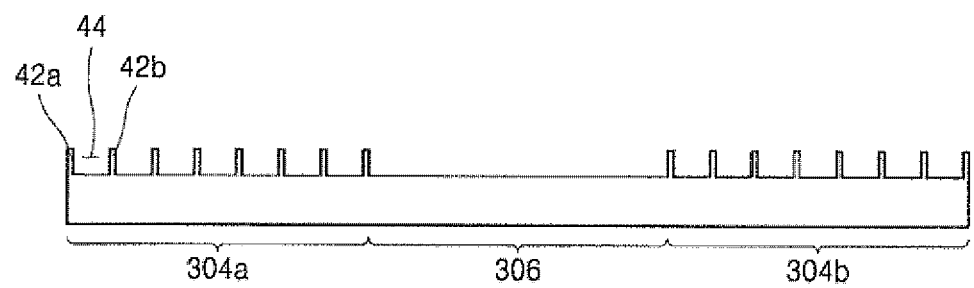
FIG. 5 is a cross-sectional view illustrating a coil accommodation structure disposed on a top surface of the coil frame according to an embodiment.

Further, referring to FIG. 5, on a bottom surface of the coil frame 302, one or more magnetic cores 320*a* to 320*h* may be disposed. When current is applied to the working coil so that an inductive magnetic field is formed between the coil and the cooking vessel, the magnetic cores 320*a* to 320*h* act to increase a magnetic flux density. More specifically, the magnetic cores 320*a* to 320*h* may be disposed on the bottom surface of the coil frame 302 in a region 314*a* corresponding to the first coil accommodation structure 304*a*, and in a region 314*b* corresponding to the second coil accommodation structure 304*b*.

In the figure, four magnetic cores are arranged in each region. However, a number, magnitude, and arrangement of the magnetic cores disposed in each region may vary depending on the embodiment. Further, in the drawing, the magnetic cores are not arranged in region 316 corresponding to the magnetic flux generation region 306 of the coil frame 302. However, according to an embodiment, the magnetic core may be disposed in the region 316 as well. The magnetic core may be made of a magnetic material, such as ferrite. However, embodiments are not limited thereto. The material constituting the magnetic core may vary depending on the embodiment.

FIG. 5 is a cross-sectional view illustrating a coil accommodation structure disposed on a top surface of the coil frame according to an embodiment. FIG. 5 is a vertical cross-sectional view of the first coil accommodation structure 304*a*, the second coil accommodation structure 304*b*, and the magnetic flux generation region 306 on the coil frame 302 shown in FIG. 3, which are cut in the Y1↔Y2 direction.

Referring to FIGS. 3 and 5, each of the first and second coil accommodation structures 304*a* and 304*b* disposed on a top surface of the coil frame 302 has one or more coil receiving grooves defined therein as described above. That is, as shown in FIG. 5, in each of the first and second coil accommodation structures 304*a* and 304*b*, a coil receiving groove 44 is defined between two spacing walls 42*a* and 42*b*. The first coil accommodation structure 304*a* and the second coil accommodation structure 304*b* may each include a plurality of spacing walls, and coil receiving grooves defined between adjacent spacing walls.

A width of the coil receiving groove, that is, a spacing between adjacent spacing walls 42*a* and 42*b*, may be set to be greater than or equal to a width of the coil inserted into the first and second coil accommodation structures 304*a* and 304*b*. Further, a depth of the coil receiving groove, that is, a height of each of the spacing walls 42*a* and 42*b*, may be set to be greater than or equal to a height of the coil.

Figure 6:
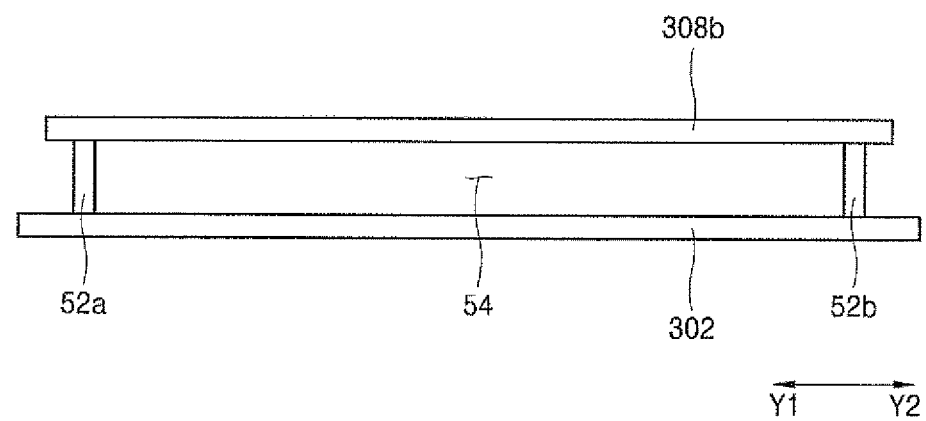
FIG. 6 is a side view of a coil holding structure placed above the top surface of the coil frame according to an embodiment.

FIG. 6 is a side view of a coil holding structure placed above the top surface of the coil frame according to an embodiment. FIG. 6 shows structure of the second coil holding structure 308*b* of the two coil holding structures 308*a* and 308*b*. The first coil holding structure 308*a* may have a same construction as that shown in FIG. 6.

Referring to FIG. 3 and FIG. 6, the second coil holding structure 308*b* may be spaced by a predetermined height apart from a top surface of the coil frame 302. As shown in FIG. 6, the second coil holding structure 308*b* may be supported by two vertical supports 52*a* and 52*b* and may be spaced vertically from the coil frame 302. Accordingly, a space 54 through which the working coil may pass may be defined between the second coil holding structure 308*b* and the coil frame 302.

Figure 7:
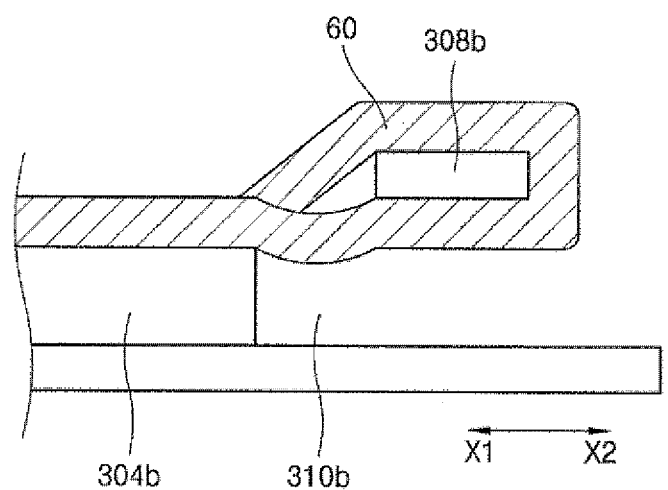
FIG. 7 shows that when a working coil is placed on the coil frame, the working coil turns around the coil holding structure, thereby changing a direction of extension of the working coil, according to an embodiment.

FIG. 7 shows that when a working coil is placed on the coil frame, the working coil turns around the coil holding structure, thereby changing a direction of extension of the working coil, according to an embodiment. That is, FIG. 7 shows an embodiment in which the extending direction of working coil 60 accommodated in the second coil accommodation structure 304*b* is switched by the second coil holding structure 308*b*. Although not shown, the extending direction of the working coil 60 accommodated in the first coil accommodation structure 304*a* may be switched by the first coil holding structure 308*a*.

Referring to FIG. 7, the working coil 60 extending in the first direction (from X1 to X2) in the second coil accommodation structure 304*b* may pass through the second intersecting space 310*b* and pass under the second coil holding structure 308*b*. Then, the working coil 60 may turn upwardly around the second coil holding structure 308*b* and again extends in the second coil accommodation structure 304*b* in the second direction (from X2 to X1).

Referring further to FIG. 7, the working coil 60 extending in the second direction (to X1 from X2) in the second coil accommodation structure 304*b* may pass through the second intersecting space 310*b* and pass above the second coil holding structure 308*b*. Then, the working coil 60 may turn downwardly around the second coil holding structure 308*b* and again extend in the second coil accommodation structure 304*b* in the first direction (to X2 from X1).

When the working coils extend in and along the first coil accommodation structure 304*a* and the second coil accommodation structure 304*b*, the first coil holding structure 308*a* and the second coil holding structure 308*b* may change the direction of the working coil from the first direction (X1→X2) to the second direction (X2→X1) or change the second direction (X2→X1) to the first direction (X1→X2). Depending on the embodiment, the working coil may extend below the first coil holding structure 308*a* or the second coil holding structure 308*b* to turn upward around the first coil holding structure 308*a* or the second coil holding structure 308*b*. Otherwise, the working coil may extend above the first coil holding structure 308*a* or the second coil holding structure 308*b* to turn downward around the first coil holding structure 308*a* or the second coil holding structure 308*b*.

Figure 8:
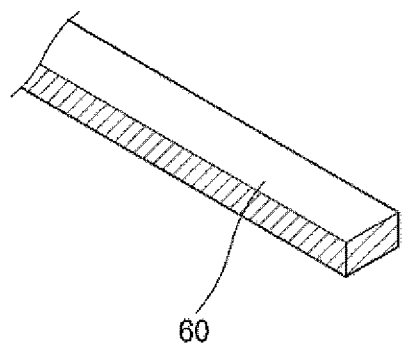
FIG. 8 shows an example of a working coil placed on a coil frame according to an embodiment.

FIG. 8 shows an example of a working coil placed on a coil frame according to an embodiment, One or more coil-receiving grooves defined in the first and second coil accommodation structures 304*a* and 304*b* illustrated in FIGS. 3 and 5 above may accommodate the working coil having a predetermined length and thickness. In this regard, as shown in FIG. 8, a cross section of the working coil 60 inserted in the coil-receiving groove may have a rectangular shape. Using such a working coil 60 having a rectangular cross section, a top surface of the working coil 60 becomes flat when the working coil 60 extends within the first and second coil accommodation structures 304*a* and 304*b*. Thus, when a current is applied to the working coil 60 and an inductive magnetic field is generated between the coil and the cooking vessel, an effect of increasing the magnetic flux density may be expected.

However, the cross section of the working coil inserted into the groove of the coil frame according to embodiments is not limited to the rectangular shape. A working coil having a different cross section, such as a circular shape, may also be used.

Figure 9:
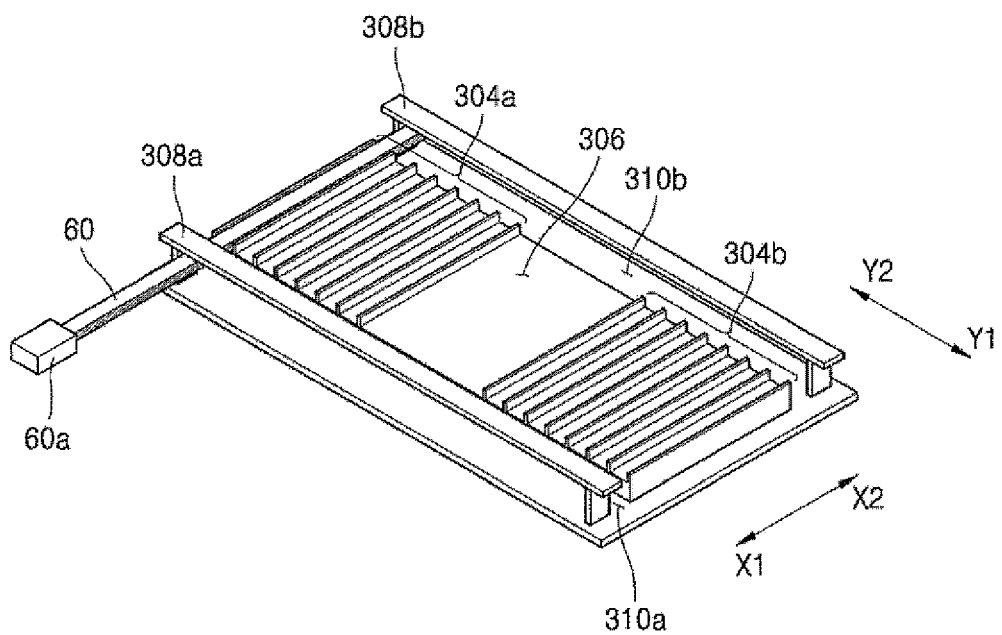
FIG. 9 shows that the working coil extends in a first direction on the coil frame according to an embodiment.
Figure 10:
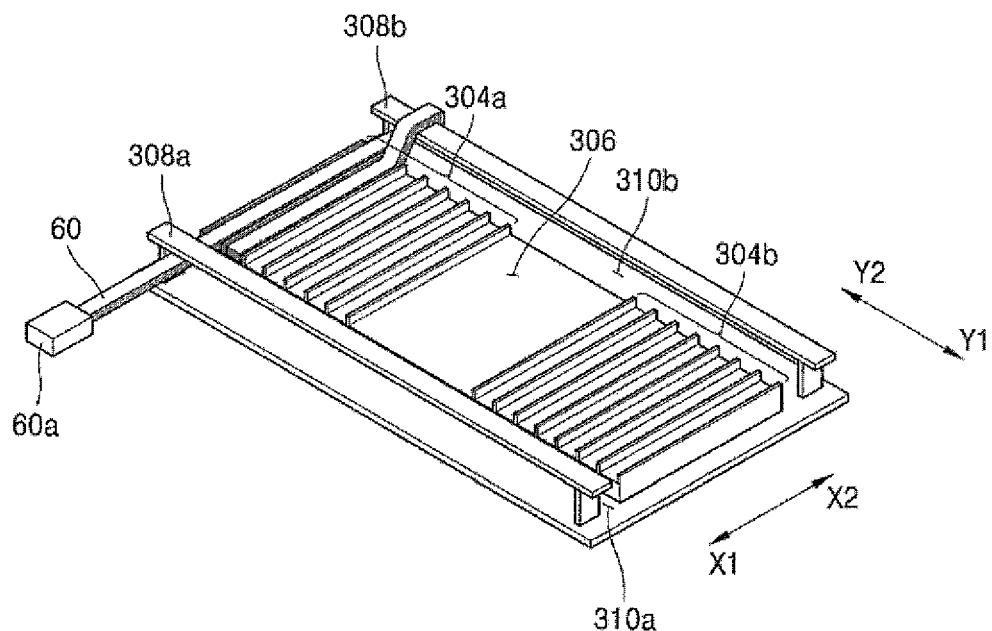
FIG. 10 shows that an extension direction of the working coil on the coil frame is switched from the first direction to a second direction according to an embodiment.

FIG. 9 shows that the working coil extends in a first direction on the coil frame according to an embodiment. FIG. 10 shows that an extension direction of the working coil on the coil frame is switched from a first direction to a second direction according to an embodiment.

Referring first to FIG. 9, in one embodiment, the working coil 60 may be inserted into a first coil receiving groove in the first coil accommodation structure 304a on the coil frame 302 in the first direction (X1→X2). With this connection, the working coil 60 may pass under the first coil holding structure 308a and be inserted into the first coil receiving groove formed in the first coil accommodation structure 304a. Alternatively, the working coil 60 may extend above the first coil holding structure 308a and be inserted into the first coil receiving groove.

The working coil 60 inserted in the first coil receiving groove may pass under the second coil holding structure 308b. Alternatively, the working coil 60 inserted in the first coil receiving groove may pass above the second coil holding structure 308b.

Next, referring to FIG. 10, the working coil 60 passing under the second coil holding structure 308b in FIG. 9 may turn upwardly around the second coil holding structure 308b. Accordingly, the extending direction of the working coil 60 may be switched from the first direction (from X1 to X2) to the second direction (from X2 to X1). The working coil 60 having the extended direction switched to the second direction (from X2 to X1) may be then inserted into a second coil receiving groove in the first coil accommodation structure 304a and then passed under the first coil holding structure 308a.

Thereafter, the working coil 60 passing under the first coil holding structure 308a may turn upwardly around the first coil holding structure 308a. Accordingly, the extending direction of the working coil 60 may be switched from the second direction (from X2 to X1) to the first direction (from X1 to X2).

As the alternating switching of the extension direction is repeated, the working coil 60 extends alternately between the first direction (from X1 to X2) and the second direction (from X2 to X1). Thus, the working coil may be inserted into and extend in all of the coil receiving grooves formed in the first coil accommodation structure 304a.

Likewise, in one embodiment, the working coil 60 may be inserted into a first coil receiving groove in the second coil accommodation structure 304b on the coil frame 302 in the first direction (X1→X2). With this connection, the working coil 60 may pass under the first coil holding structure 308a and be inserted into the first coil receiving groove formed in the second coil accommodation structure 304b. Alternatively, the working coil 60 may extend above the first coil holding structure 308a and be inserted into the first coil receiving groove.

The working coil 60 inserted in the first coil receiving groove may pass under the second coil holding structure 308b. Alternatively, the working coil 60 inserted in the first coil receiving groove may pass above the second coil holding structure 308b.

Next, referring to FIG. 10, the working coil 60 passing under the second coil holding structure 308b in FIG. 9 may turn upwardly around the second coil holding structure 308b. Accordingly, the extending direction of the working coil 60 may be switched from the first direction (from X1 to X2) to the second direction (from X2 to X1). The working coil 60 having the extended direction switched to the second direction (from X2 to X1) may be then inserted into a second coil receiving groove in the second coil accommodation structure 304b and then passed under the first coil holding structure 308a.

Thereafter, the working coil 60 passing under the first coil holding structure 308a may turn upwardly around the first coil holding structure 308a. Accordingly, the extending direction of the working coil 60 may be switched from the second direction (from X2 to X1) to the first direction (from X1 to X2).

As the alternating switching of the extension direction is repeated, the working coil 60 may extend alternately between the first direction (from X1 to X2) and the second direction (from X2 to X1). Thus, the working coil may be inserted into and extend in all of the coil receiving grooves formed in the second coil accommodation structure 304b.

Figure 11:
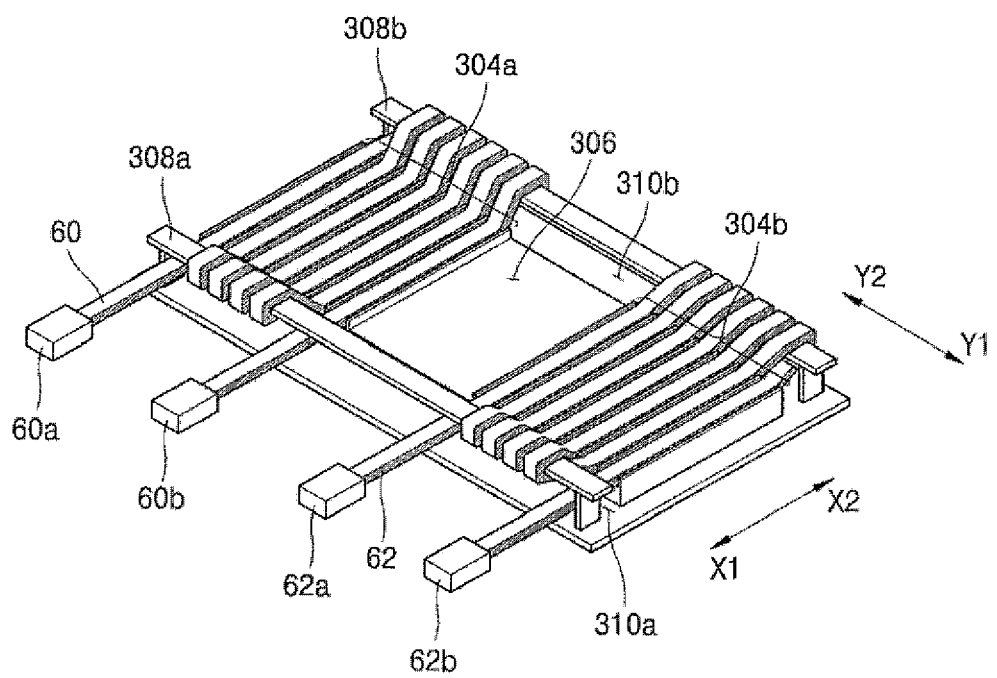
FIG. 11 shows that a first coil accommodation structure and a second coil accommodation structure on the coil frame accommodate different first and second working coils respectively according to an embodiment.

FIG. 11 shows that a first coil accommodation structure and a second coil accommodation structure on the coil frame accommodating different first and second working coils respectively according to an embodiment. Referring to FIG. 11, according to the extension method illustrated in FIGS. 9 and 10 above, first working coil 60 may be inserted into grooves in first coil accommodation structure 304a. At the same time, according to the extension method illustrated in FIGS. 9 and 10 above, second working coil 62 may be inserted into grooves in second coil accommodation structure 304b. Both ends of the first working coil 60 may be connected respectively to connectors 60a and 60b that electrically connect the first working coil 60 to a control unit or controller (not shown) or a power supply (not shown). Likewise, both ends of the second working coil 62 may be connected respectively to connectors 62a and 62b that electrically connect the second working coil 62 to a control unit or controller (not shown) or a power supply (not shown).

When the first and second working coils 60 and 62 are disposed in the first coil accommodation structure 304a and the second coil accommodation structure 304b, respectively, a heating operation of a cooking vessel may be performed by controlling an amplitude, magnitude, and timing of current applied to each of the first and second working coils 60 and 62 via the control of the control unit (not shown).

Figure 12:
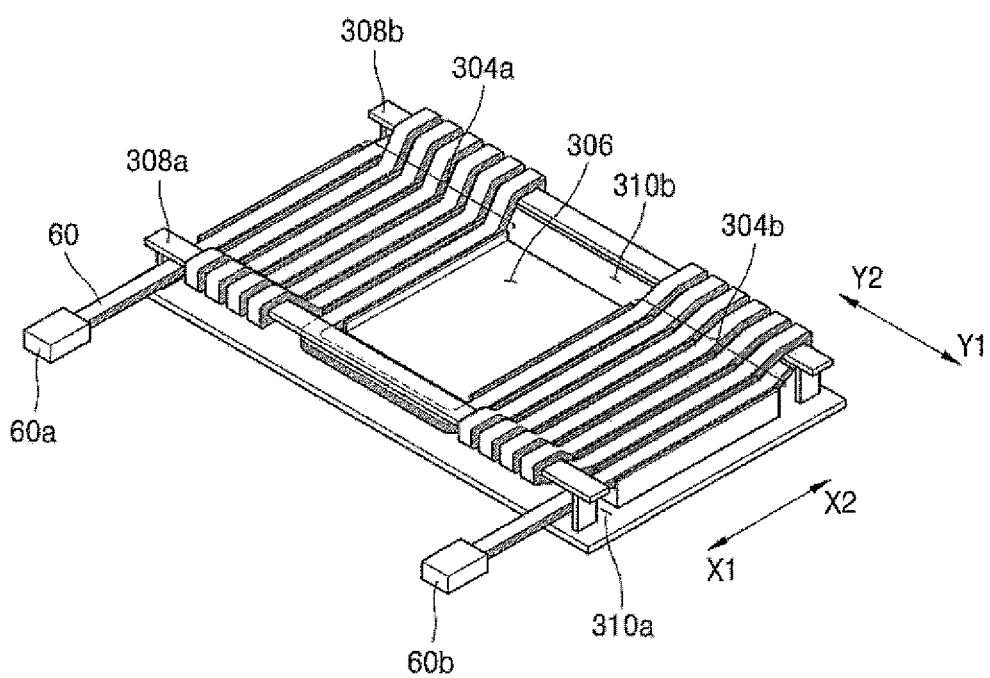
FIG. 12 shows that a first coil accommodation structure and a second coil accommodation structure on the coil frame accommodate a single working coil according to an embodiment.

FIG. 12 shows that a first coil accommodation structure and a second coil accommodation structure on the coil frame accommodate a single working coil according to an embodiment. Referring to FIG. 12, according to the extension method illustrated in FIGS. 9 and 10 above, the single working coil 60 may be inserted into grooves in the first coil accommodation structure 304a. Subsequently, according to the extension method illustrated in FIGS. 9 and 10 above, the single working coil 60 may be inserted into grooves in the second coil accommodation structure 304b. As shown in FIG. 12, the working coil 60 extending in the first coil accommodation structure 304a may extend along a lower end of first coil holding structure 308a toward the second accommodation structure 304b. Alternatively, the working coil 60 extending in the first coil accommodation structure 304a may extend along a lower end of second coil holding structure 308b to the second coil accommodation structure 304b. Both ends of the working coil 60 may be connected respectively to connectors 60a and 60b that electrically connect the working coil 60 to a control unit or controller (not shown) or a power supply (not shown).

Figure 13:
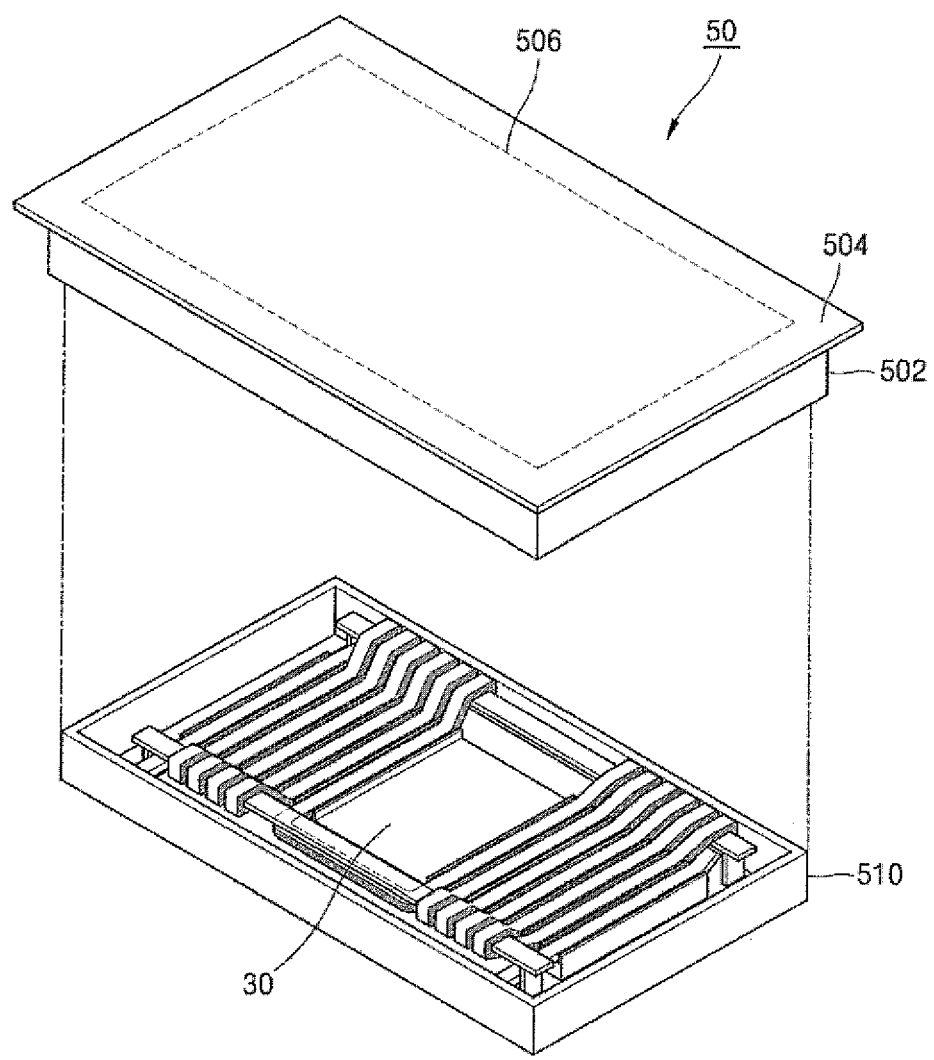
FIG. 13 is a perspective view of an induction heating device including a coil assembly according to an embodiment.

FIG. 13 is a perspective view of an induction heating device including a coil assembly according to an embodiment. Referring to FIG. 13, an induction heating device 50 employing a free zone scheme may include a casing 510 that accommodates coil assembly 30 according to embodiments, and a cover plate 502 that seals the casing 510. Further, a rectangular heating region 506 may be defined in a plate 504 contained within the cover plate 502. This allows a user to freely place a cooking vessel, such as a pot or container to be heated, on or at any location in rectangular heating region 506. In the embodiment shown in FIG. 13, only one coil assembly 30 is disposed inside the casing 510. In accordance with an embodiment, one or more coil assemblies may be disposed within the casing 510.

As illustrated in FIGS. 3 to 12, the coil frame of the coil assembly 30 according to embodiments may have a rectangular shape. Further, an overall arrangement shape of the working coil alternately extending in between the first direction (X1→X2) and the second direction (X2→X1) in the coil accommodation structure on the coil frame may have a roughly rectangular shape.

Figure 2:
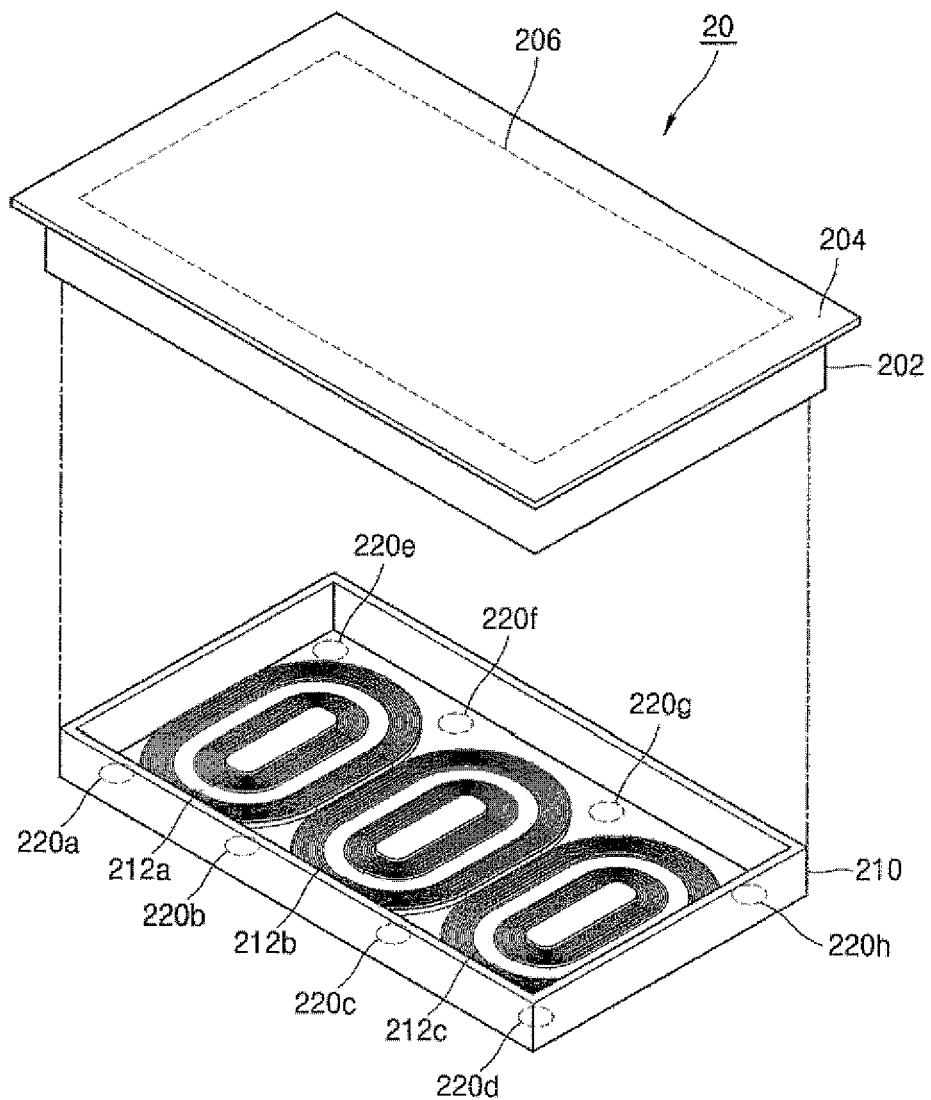
FIG. 2 is a perspective view of a related art induction heating device having a free zone scheme.

When the coil assembly 30 according to embodiments is applied to the induction heating device having a rectangular heating region 506 as shown in FIG. 13, the non-coil regions 220a to 220h corresponding to the heating region 206 but not corresponding to the working coils are absent between the working coils 212a, 212b, and 212c included in the conventional induction heating device 20 employing the free zone scheme, and between the working coils 212a, 212b, and 212c and the walls of the casing 210 as shown in FIG. 2.

Thus, the induction heating device 50 employing the free zone scheme, including the coil assembly 30 according to embodiments may provide a constant heating power regardless of where the user places the cooking vessel on the heating region 506. This may prevent reduction of power efficiency based on a position of the cooking vessel, and thus, prevent a heating time and cooking time from increasing, which may otherwise occur in the conventional induction heating device 20 as shown in FIG. 2.

Embodiments disclosed herein provide a coil assembly and an induction heating device including a coil assembly, in which non-coil regions corresponding to a heating region but not corresponding to the working coils may be absent between the working coils included in the induction heating device employing the free zone scheme, and between the working coils and the walls of the casing, thereby to prevent reduction of power efficiency based on a position of a cooking vessel, and thus, to prevent a heating time and cooking time from increasing.

Embodiments disclosed herein provide an induction heating device with a new structure to overcome disadvantages of conventional induction heating devices with a free zone scheme. A coil assembly included in an induction heating device according to an embodiment may include a coil frame having a shape corresponding to a shape of a heating region defined in a plate. Further, the working coil included in the coil assembly according to an embodiment may extend alternately between opposite first and second directions, rather than extending circularly as in the conventional working coil. An overall arrangement shape of the working coil having such an alternating arrangement may have a rectangular shape instead of a circular shape or an elliptic shape as in the related art.

Thus, the induction heating device employing the free zone scheme, including the coil assembly according to embodiments, provides a constant heating power regardless of where a user places a cooking vessel on the heating-region. This may prevent reduction of power efficiency based on the position of the cooking vessel, and thus, to prevent a heating time and cooking time from increasing, which may otherwise occur in the related art induction heating device.

Embodiments disclosed herein provide a coil assembly that may include a coil frame; a coil accommodation structure disposed on a first surface of the frame; and a working coil extending in the coil accommodation structure. A direction of extension of the working coil may be alternated between opposite first and second directions. The coil accommodation structure may include first and second coil accommodation structures. The working coil may include first and second working coils. The first working coil may extend in the first coil accommodation structure, while the second working coil in the second coil accommodation structure. A magnetic flux generation region may be defined between the first coil accommodation structure and the second coil accommodation structure.

The coil accommodation structure may have a coil receiving groove defined therein for receiving the working coil therein. The coil assembly may further include first and second coil holding structures. The first and second coil holding structures may extend respectively along both opposing lateral elongate sides of the coil accommodation structure. The working coil may turn around the first coil holding structure such that the extension direction of the working coil changes from the first direction to the second direction. The working coil may turn around the second coil holding structure such that the extension direction of the working coil changes from the second direction to the first direction. A first intersecting space may be defined between the coil accommodation structure and the first coil holding structure, while a second intersecting space may be defined between the coil accommodation structure and the second coil holding structure.

The working coil may have a rectangular-shaped cross-section. The coil assembly may further include at least one magnetic core disposed on a second surface of the coil frame. The first surface may be opposite to the second surface.

Embodiments disclosed herein further provide an induction heating device that may include a cover plate including a plate, a heating region being defined in the plate; a coil assembly disposed below the plate, the coil assembly vertically overlapping the heating region; and a casing that houses the coil assembly. The casing may be blocked at a top thereof by the cover plate. The coil assembly may include a coil frame; a coil accommodation structure disposed on a first surface of the frame; and a working coil extending in the coil accommodation structure. A direction of the extension of the working coil may be alternated between opposite first and second directions.

The coil accommodation structure may include first and second coil accommodation structures. The working coil may include first and second working coils. The first working coil may extend in the first coil accommodation structure, while the second working coil in the second coil accommodation structure. A magnetic flux generation region may be defined between the first coil accommodation structure and the second coil accommodation structure. The coil accommodation structure may have a coil receiving groove defined therein for receiving the working coil therein.

The coil assembly may further include first and second coil holding structures. The first and second coil holding structures may extend respectively along both opposing lateral elongate sides of the coil accommodation structure. The working coil may turn around the first coil holding structure such that the extension direction of the working coil changes from the first direction to the second direction. The working coil may turn around the second coil-holding structure such that the extension direction of the working coil changes from the second direction to the first direction.

A first intersecting space may be defined between the coil accommodation structure and the first coil holding structure, while a second intersecting space may be defined between the coil accommodation structure and the second coil holding structure. The working coil may have a rectangular-shaped cross-section.

The coil assembly may further include at least one magnetic core disposed on a second surface of the coil frame. The first surface may be opposite to the second surface.

The non-coil regions corresponding to the heating region but not corresponding to the working coils may be absent between the working coils included in the induction heating device employing the free zone scheme, and between the working coils and the walls of the casing, thereby to prevent reduction of power efficiency based on the position of the cooking vessel, and thus, to prevent a heating time and the cooking time from increasing.

In the above description, numerous specific details are set forth in order to provide a thorough understanding of embodiments. The embodiments may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope as defined by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A coil assembly, comprising:
a coil frame having a shape of a flat plate, wherein a coil accommodation structure is disposed on a first surface of the coil frame; and
a working coil extending in the coil accommodation structure, wherein a direction of extension of the working coil is alternated between opposite first and second direction wherein the coil frame includes:

a first coil holding structure having a shape of a bar, disposed at a first side of the coil accommodation structure and being spaced apart from the first surface of the coil frame; and a second coil holding structure having a shape of a bar, disposed at a second side of the coil accommodation structure and opposite to the first coil holding structure, and being spaced apart from the first surface of the coil frame, wherein the working coil is wound and turns around the first coil holding structure such that the direction of extension of the working coil is changed from the first direction to the second direction, and wherein the working coil is wound and turns around the second coil holding structure such that the direction of extension of the working coil is changed from the second direction to the first direction.

2. The coil assembly of claim 1, wherein the coil accommodation structure includes:
   a first coil accommodation structure, wherein a first working coil extends in the first coil accommodation structure; and
   a second coil accommodation structure, wherein a second working coil extends in the second coil accommodation structure, and wherein a magnetic flux generation region is defined between the first coil accommodation structure and the second coil accommodation structure.

3. The coil assembly of claim 1, wherein the coil accommodation structure includes at least one coil receiving groove defined therein configured to receive the working coil therein.

4. The coil assembly of claim 1, wherein the coil frame includes:
   a first intersecting space defined between the coil accommodation structure and first coil holding structure; and
   a second intersecting space defined between the coil accommodation structure and second coil holding structure.

5. The coil assembly of claim 1, wherein the working coil is wound in a rectangular shape.

6. The coil assembly of claim 1, further comprising at least one magnetic core disposed on a second surface of the coil frame.

7. An induction heating device, comprising:
   a cover plate including a plate, wherein a heating region is defined in the plate;
   a coil assembly disposed below the plate, wherein the coil assembly corresponds to the heating region; and
   a casing that houses the coil assembly therein, wherein the casing is sealed by the cover plate, and wherein the coil assembly comprises:
   a coil frame having a shape of a flat plate, wherein a coil accommodation structure is disposed on a first surface of the coil frame; and
   a working coil extending in the coil accommodation structure, wherein a direction of extension of the working coil is alternated between opposite first and second directions, wherein the coil frame includes:
      a first coil holding structure having a shape of a bar, disposed at a first side of the coil accommodation structure and being spaced apart from the first surface of the coil frame; and
      a second coil holding structure having a shape of a bar, disposed at a second side of the coil accommodation structure and opposite to the first coil holding structure, and being spaced apart from the first surface of the coil frame, wherein the working coil is wound and turns around the first coil holding structure such that the direction of extension of the working coil is changed from the first direction to the second direction, and wherein the working coil is wound and turns around the second coil holding structure such that the direction of extension of the working coil is changed from the second direction to the first direction.

8. The induction heating device of claim 7, wherein the coil accommodation structure includes:
   a first coil accommodation structure, wherein a first working coil extends in the first coil accommodation structure; and
   a second coil accommodation structure, wherein a second working coil extends in the second coil accommodation structure, and wherein a magnetic flux generation region is defined between the first coil accommodation structure and the second coil accommodation structure.

9. The induction heating device of claim 7, wherein the coil accommodation structure includes at least one coil receiving groove defined therein configured to receive the working coil therein.

10. The induction heating device of claim 7, wherein the coil frame includes:
    a first intersecting space defined between the coil accommodation structure and first coil holding structure; and
    a second intersecting space defined between the coil accommodation structure and second coil holding structure.

11. The induction heating device of claim 7, wherein the coil assembly further comprises at least one magnetic core disposed on a second surface of the coil frame.

12. A coil assembly, comprising:
    a coil frame having a shape of a flat plate; and
    a coil accommodation structure disposed on a first surface of the coil frame, wherein the coil accommodation structure includes:
       a first coil accommodation structure including a plurality of coil-receiving grooves configured to receive a first working coil; and
       a second coil accommodation structure including a plurality of coil-receiving grooves configured to receive a second working coil, wherein the coil frame includes:
          a first coil holding structure having a shape of a bar, disposed at a first side of the coil accommodation structure and being spaced apart from the first surface of the coil frame, and a second coil holding structure having a shape of a bar, disposed at a second side of the coil accommodation structure and opposite to the first coil holding structure, and being spaced apart from the first surface of the coil frame, wherein the working coil is wound and turns around the first coil holding structure such that the direction of extension of the working coil is changed from the first direction to the second direction, and wherein the working coil is wound and turns around the second coil holding structure such that the direction of extension of the working coil is changed from the second direction to the first direction.

13. The coil assembly of claim 12, wherein a magnetic flux generation region is defined between the first coil accommodation structure and the second coil accommodation structure.

14. The coil assembly of claim 12, further comprising at least one magnetic core disposed on a second surface of the coil frame.

* * * * *